(12) United States Patent
Zuidema et al.

(10) Patent No.: US 10,225,547 B2
(45) Date of Patent: *Mar. 5, 2019

(54) MOBILE DISPLAY DEVICE

(71) Applicant: ULTRA-D COÖPERATIEF U.A., Eindhoven (NL)

(72) Inventors: Hans Zuidema, Eindhoven (NL); Waltherus Antonius Hendrikus Roelen, Asten (NL); Abraham Karel Riemens, Eersel (NL)

(73) Assignee: ULTRA-D COÖPERATIEF U.A., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/594,484

(22) Filed: May 12, 2017

(65) Prior Publication Data

US 2017/0251205 A1    Aug. 31, 2017

Related U.S. Application Data

(63) Continuation of application No. 14/371,654, filed as application No. PCT/EP2012/076754 on Dec. 21, 2012, now Pat. No. 9,681,121.

(30) Foreign Application Priority Data

Jan. 11, 2012    (EP) .................................. 12150796.6

(51) Int. Cl.
*H04N 13/00* (2018.01)
*H04N 9/47* (2006.01)
(Continued)

(52) U.S. Cl.
CPC ......... *H04N 13/356* (2018.05); *G06F 1/1637* (2013.01); *G06F 1/1647* (2013.01);
(Continued)

(58) Field of Classification Search
CPC .............. H04N 13/0497; H04N 5/247; H04N 13/0402; H04N 13/0452; H04N 13/0468; G06F 1/1647; G06F 1/1694; G06F 3/041
(Continued)

(56) References Cited

U.S. PATENT DOCUMENTS

| 5,986,634 A | 11/1999 | Alioshin |
| 6,061,489 A | 5/2000 | Ezra |

(Continued)

FOREIGN PATENT DOCUMENTS

| CN | 1487331 | 4/2004 |
| CN | 1799267 | 7/2004 |

(Continued)

OTHER PUBLICATIONS

International Search Report for PCT/EP2012/076754 dated May 27, 2013.

(Continued)

*Primary Examiner* — Helen Shibru
(74) *Attorney, Agent, or Firm* — Nixon & Vanderhye P.C.

(57) ABSTRACT

Mobile display device 100 for enabling a user to obtain either three-dimensional [3D] or two-dimensional [2D] viewing of content, comprising a 3D display 120 for enabling the 3D viewing of the content, a 2D display 140 for enabling the 2D viewing of the content, a display processor for displaying the content as 3D content 124 on the 3D display and for displaying the content as 2D content 144 on the 2D display, the 3D display and the 2D display being arranged on opposite faces 122, 142 of the device for enabling the user to obtain either the 3D viewing or the 2D viewing of the content by turning 102 the device about-face.

13 Claims, 3 Drawing Sheets

(51) Int. Cl.
  *H04N 13/356* (2018.01)
  *H04N 13/302* (2018.01)
  *H04N 13/366* (2018.01)
  *G06F 1/16* (2006.01)
  *H04N 13/398* (2018.01)
  *G06F 3/041* (2006.01)
  *H04N 5/247* (2006.01)

(52) U.S. Cl.
  CPC ............ *G06F 1/1694* (2013.01); *G06F 3/041* (2013.01); *H04N 5/247* (2013.01); *H04N 13/302* (2018.05); *H04N 13/366* (2018.05); *H04N 13/398* (2018.05); *G06F 2200/1637* (2013.01); *H04N 2213/001* (2013.01)

(58) Field of Classification Search
  USPC .......................................................... 348/51
  See application file for complete search history.

(56) References Cited

U.S. PATENT DOCUMENTS

| | | | |
|---|---|---|---|
| 6,115,058 A | 9/2000 | Omori | |
| 6,144,358 A | 11/2000 | Narayanaswamy | |
| 6,798,429 B2 | 9/2004 | Bradski | |
| 6,972,752 B2 | 12/2005 | Nako | |
| 9,681,121 B2* | 6/2017 | Zuidema | H04N 13/0452 |
| 2002/0008906 A1 | 1/2002 | Tomita | |
| 2002/0063695 A1 | 5/2002 | Canova | |
| 2003/0076423 A1 | 4/2003 | Dolgoff | |
| 2004/0017529 A1 | 1/2004 | Choi et al. | |
| 2004/0203520 A1 | 10/2004 | Schirtzinger | |
| 2005/0030301 A1* | 2/2005 | Harrold | G02B 27/225 345/204 |
| 2005/0040753 A1 | 2/2005 | Osame | |
| 2005/0062715 A1 | 3/2005 | Tsuji | |
| 2005/0104823 A1 | 5/2005 | Giraldo | |
| 2005/0259180 A1 | 11/2005 | Su | |
| 2005/0285997 A1 | 12/2005 | Koyama et al. | |
| 2006/0082518 A1* | 4/2006 | Ram | G06F 1/1601 345/1.1 |
| 2006/0100021 A1* | 5/2006 | Yoshino | A63F 13/00 463/45 |
| 2006/0269226 A1 | 11/2006 | Ito | |
| 2007/0085759 A1 | 4/2007 | Lee | |
| 2007/0188450 A1 | 8/2007 | Hernandez et al. | |
| 2008/0062625 A1 | 3/2008 | Batio | |
| 2008/0252638 A1* | 10/2008 | Riemens | H04N 13/15 345/419 |
| 2009/0040426 A1 | 2/2009 | Mather | |
| 2009/0091667 A1 | 4/2009 | Schultz et al. | |
| 2010/0033680 A1* | 2/2010 | Krijn | G02B 27/2214 353/8 |
| 2010/0079584 A1* | 4/2010 | Sung | G02B 27/2214 348/52 |
| 2010/0181022 A1* | 7/2010 | Zuidema | G02B 3/0012 156/272.2 |
| 2010/0195203 A1 | 8/2010 | Zuidema | |
| 2011/0076003 A1 | 3/2011 | Cho et al. | |
| 2011/0090315 A1 | 4/2011 | Shibata | |
| 2011/0122127 A1 | 5/2011 | Ko | |
| 2011/0125404 A1 | 5/2011 | Czompo | |
| 2011/0157329 A1 | 6/2011 | Huang | |
| 2012/0019735 A1* | 1/2012 | Zuidema | G02F 1/133305 349/15 |
| 2012/0036433 A1 | 2/2012 | Zimmer | |
| 2012/0120204 A1 | 5/2012 | Ohno | |
| 2012/0309515 A1* | 12/2012 | Chung | H04N 21/274 463/31 |
| 2013/0120837 A1* | 5/2013 | Zuidema | G02B 3/0043 359/463 |
| 2013/0311868 A1* | 11/2013 | Monney | G06F 17/30017 715/230 |
| 2014/0254010 A1 | 9/2014 | Lin | |
| 2015/0154723 A1 | 6/2015 | Wu | |

FOREIGN PATENT DOCUMENTS

| | | |
|---|---|---|
| CN | 201364528 | 12/2009 |
| EP | 1 394 593 | 3/2004 |
| EP | 1 633 148 | 3/2006 |
| EP | 1601166 | 11/2006 |
| GB | 2451943 | 2/2009 |
| JP | 2001236051 | 8/2001 |
| JP | 2002-372929 | 12/2002 |
| JP | 2007-220109 | 8/2007 |
| JP | 2009031448 | 2/2009 |
| KR | 20100117053 | 11/2010 |
| WO | 2009153391 | 12/2009 |
| WO | 2011083975 | 7/2011 |

OTHER PUBLICATIONS

Written Opinion of the International Searching Authority dated May 27, 2013.
Response to Written Opinion dated Oct. 4, 2013, 4 pages.
D. Zatz, "Amazon Kindle Tablet Features Dual Screens?", http://www.zatznotfunny.com/2011-07/amazon-kindle-tablet-houses-dual-screens/ , 5 pages, retrieved Aug. 3, 2011.
H. Skipworth, Asus 3D Eee Pad MeMO: Glasses-free tablet 3D, we go hands-on, http://www.pocket-lint.com/news/40223/asus-announces-eeepad-3d-details, 3 pages, retrieved Aug. 3, 2011.
K. Hinckley et al., Sensing Techniques for Mobile Interactions, Proceedings of the 2000 ACM SIGCPR Conference, Apr. 6, 2000, Apr. 8, 2000, pp. 91-100.
W. Qingqing: "Converting 2Dto 3D: A Survey", Delft University of Technology, Dec. 2005, XP002469656.

* cited by examiner

MOBILE DISPLAY DEVICE

CROSS-REFERENCE

This application is a continuation of commonly owned U.S. application Ser. No. 14/371,654, filed Jul. 10, 2014, 2011 (now U.S. Pat. No. 9,681,121), which is the U.S. national phase of International Application No. PCT/EP2012/076754, filed Dec. 21, 2012, which designated the U.S. and claims priority to European Application No. 12150796.6, filed Jan. 11, 2012, the entire contents of each of which are hereby incorporated by reference.

FIELD OF THE INVENTION

The invention relates to a mobile display device and a method for enabling a user to obtain either three-dimensional [3D] (i.e., further referred to as 3D), or two-dimensional [2D] (i.e., further referred to as 2D), viewing of content. The invention further relates to a tablet device, smart phone and digital photo frame comprising the mobile display device, and a computer program product for performing the method.

Mobile display devices are devices with a portable form factor which comprise a display for displaying content to a user. Such devices frequently comprise batteries for being operational without having to be connected to an electrical power socket. Examples of these types of mobile display devices are smart phones such as the Apple iPhone and tablet devices such as the Apple iPad or the Samsung Galaxy Tab. Some types of mobile display devices do not comprise batteries and thus need to be connected to the electrical power socket in order to be operational, e.g., digital photo frames, but nevertheless have a portable form factor to allow, e.g., easy placement within a house or workplace.

The aforementioned devices have in common that they provide the user access to one or multiple types of content. This content is frequently visual content, and as such, mobile display devices often comprise displays that are large with respect to the devices themselves in order to optimally display movies, internet content, games, photos, etc.

BACKGROUND OF THE INVENTION

An internet publication, http://www.pocket-lint.com/news/40223/asus-announces-eeepad-3d-details, as obtained on Aug. 8, 2011, details a planned tablet device from the manufacture ASUS. According to the publication, the tablet device comprises a 3D screen, and notes that, "rather than running entirely in 3D, something which would presumably place a pretty heavy drain on your eyes, the device has a switchable 3D mode".

SUMMARY OF THE INVENTION

A problem of the aforementioned tablet device having a switchable 3D mode is that the quality of the switchable 3D mode is insufficient.

It would be advantageous to have an improved mobile display device or method for enabling a user to obtain either 3D or 2D viewing of content.

To better address this concern, a first aspect of the invention provides a mobile display device for enabling a user to obtain either three-dimensional [3D] or two-dimensional [2D] viewing of content, comprising a 3D display for enabling the 3D viewing of the content, a 2D display for enabling the 2D viewing of the content, a display processor for displaying the content as 3D content on the 3D display and for displaying the content as 2D content on the 2D display, the 3D display and the 2D display being arranged on opposite faces of the device for enabling the user to obtain either the 3D viewing or the 2D viewing of the content by turning the device about-face.

In a further aspect of the invention, a tablet device or smart phone is provided comprising the mobile display device set forth. In a further aspect of the invention, a digital photo frame is provided comprising the mobile display device set forth.

The aforementioned measures enable a user to obtain either 3D or 2D viewing of content on a mobile display device. For that purpose, the device comprises a 3D display which enables the user to perceive the content in 3D, i.e., by means of stereoscopy, involving enabling each of the eyes of the user to perceive a slightly different view of the content and thereby providing an impression of depth to the user. In addition to the 3D display, the device comprises a 2D display on which the user can perceive the content in 2D, i.e., without providing stereoscopy. The device further comprises a display processor that is capable of enabling display of the content in 3D on the 3D display and display of the content on 2D on the 2D display. The content may be any content that may be displayable on a mobile display device, such as, e.g., movies, internet content, photos, games, applications, etc. The 3D display and the 2D display are arranged on outer surfaces of the device that are opposite with respect to each other, i.e., both surfaces are facing away from each other. Consequently, the display directions of the 3D display and the 2D display, as defined by, e.g., the normal vectors of the display surfaces of said displays, are also facing away from each other.

The aforementioned measures have the effect that a mobile display device is provided comprising two displays that are arranged on opposite faces of the device, with one of the displays being a 3D display and the other being a 2D display for enabling the user to obtain either 3D viewing or 2D viewing of content by turning the device about-face, i.e., from one face to the other, oppositely arranged, face. Consequently, a user may decide between 3D viewing and 2D viewing of the content by simply flipping over the mobile display device. The present invention is partially based on the recognition that turning the device about-face is an intuitive manner of switching between the 3D and 2D viewing of content. Advantageously, when viewing the content on the 3D display, the user is not distracted by the 2D display, or vice versa, since it is hidden from view on the opposite face of the device. Advantageously, the size of the 3D display is not limited by a presence of the 2D display, or vice versa, as both displays are arranged on opposite faces of the device. Advantageously, each display may be optimized specifically for 3D or 2D viewing, instead of, when using a 3D display, having to compromise on the 2D viewing thereon.

Optionally, the device further comprises orientation means for generating orientation data indicative of an orientation of the device, and the display processor is arranged for, in dependence on the orientation data, displaying the content either on the 3D display or on the 2D display. Optionally, a method is provided of enabling a user to obtain either three-dimensional [3D] or two-dimensional [2D] viewing of content using a mobile display device, the mobile display device comprising a 3D display for enabling the 3D viewing of the content, a 2D display for enabling the 2D viewing of the content, and the 3D display and the 2D display being arranged on opposite faces of the device, and the method comprising generating orientation data indicative of an orientation of the device, and displaying, in dependence on the orientation data, the content either as 3D content on the 3D display or as 2D content on the 2D display for enabling the user to obtain either the 3D viewing or the 2D viewing of the content by turning the device about-face The above measures result in the orientation of the device affecting whether the content is displayed on the 3D display or on the 2D display. The orientation of the device typically determines a visibility of either of the displays to the user, e.g., it may be a result of the user having oriented the device to view a specific one of the displays. In these cases, the oppositely arranged display is not visible to the user, nor is its contents. The orientation data is therefore used to determine on which of both displays the content is displayed. Advantageously, by only displaying the content on either of said displays, the power consumption of the other display, i.e., on which the content is not displayed, is reduced.

Optionally, the display processor is arranged for, in dependence on a change in the orientation of the device, switching between displaying the content on the 3D display and displaying the content on the 2D display. A change in orientation of the device is typically due to an action of the user, e.g., it may be a consequence of the user turning the device to view the oppositely arranged display instead of the display he is currently viewing. To accommodate this, the change in orientation of the device is used to switch between displaying the content on the 3D display and displaying the content on the 2D display. Advantageously, a change in orientation may be more reliably detected than an absolute degree of orientation. Advantageously, a change in orientation may be earlier detected than an absolute degree of orientation resulting from the change in orientation, therefore enabling the display processor to earlier switch or to gradually introduce said switching.

Optionally, the orientation means comprises a first camera for estimating the orientation of the device with respect to the user by detecting a presence of the user in a viewport of the first camera. The orientation of the device with respect to the user is of particular relevance, since said orientation determines a visibility of either of the displays to the user. By detecting the presence of the user in a viewport of the first camera, the location of the user with respect to the first camera, and thus with respect to the device itself, is known. As such, the content may be established on either the 3D display or the 2D display in dependence on orientation data indicative of a location of the user with respect to the device.

Optionally, the orientation means comprises an accelerometer for establishing a direction of gravity, and the display processor is arranged for displaying the content on an upward or downward facing one of the 3D display and the 2D display by comparing the orientation of the device to the direction of gravity. The accelerometer is used to establish an upward, or alternatively, downward facing one of the 3D display and the 2D display for, regardless of the orientation of the device, always displaying the content on an upward, or alternatively, downward facing one of said displays. This optional measure is based on the recognition that the user typically views the device from an upward direction, i.e., looks down onto the device. Thus, the content may be displayed on the upward facing one of the displays. Alternatively, in some settings, e.g., when lying on a couch, the user typically views the device from a downward direction, i.e., looking up onto the device. Therefore, alternatively, the content may be displayed on the downward facing one of the displays.

Optionally, the device further comprises a user input for enabling the user to configure the display processor for displaying the content on either the upward or the downward facing one of the 3D display and the 2D display. The user can thus select whether the content should, by default, be displayed on the upward or downward facing one of the displays. Advantageously, the user can configure the device to various usage situations, e.g., for operating the device while lying on a couch, standing, sitting on a chair, etc.

Optionally, the device further comprises a first camera arranged alongside the 3D display and a second camera arranged alongside the 2D display, the first camera having a first camera function in the device, the second camera having a second camera function in the device, and the display processor being arranged for, in dependence on the orientation data, exchanging the first camera function and the second camera function in the device. The device comprises two oppositely facing cameras. The functionality of the cameras typically relates to an orientation of the device with respect to the user. For example, in video chat applications, the camera facing the user may be used for recording and transmitting video of the user, whereas in photography applications, the camera facing away from the user may be used for taking pictures. It is desirable to, when the user turns the device about-face to switch between viewing the content in 2D and 3D, to exchange camera functionality in the device accordingly. To accommodate this, the first camera function of the first camera and the second camera function of the second camera are exchanged in the device, and as a result, their functionality is exchanged in, e.g., a video chat application running on the device.

Optionally, the display processor is arranged for performing a 2D-to-3D conversion when the content is originally 2D content for said displaying the content as 3D content on the 3D display, or performing a 3D-to-2D conversion when the content is originally 3D content for said displaying the content as 2D content on the 2D display. By performing a 2D-to-3D conversion, 2D content is converted into a format that is displayable on the 3D display. By performing a 3D-to-2D conversion, 3D content is converted into a format that is displayable on the 2D display. Thus, irrespective of whether the content is originally 2D or 3D, it can be displayed on either of the 3D display or the 2D display.

Optionally, the display processor is arranged for displaying an indicator on the 2D display when displaying originally 3D content on the 2D display for alerting the user to turn the device about-face to obtain 3D viewing of the content on the 3D display, or displaying the indicator on the 3D display when displaying originally 2D content on the 3D display for alerting the user to turn the device about-face to obtain 2D viewing of the content on the 2D display. The display of originally 2D content on a 3D display is typically less optimal than the display of said content on a 2D display. Similarly, the display of originally 3D content on a 2D display is typically less optimal than the display of said content on a 3D display. By displaying an indicator to the user in the aforementioned situations, the user can perceive whether he is viewing originally 2D content on the 3D display, or originally 3D content on the 2D display. Advantageously, the user is alerted to the fact that he may obtain viewing of the content in its original format by turning the device about-face.

Optionally, the device further comprises a first touch sensor arranged on or alongside the 3D display and a second touch sensor arranged on or alongside the 2D display. By providing a touch sensor on or alongside both displays, touch based interaction with the user is possible irrespective of which display the user is viewing.

Optionally, the first touch sensor has a first touch function in the device, the second touch sensor has a second touch function in the device, and the display processor is arranged for, in dependence on the orientation data, exchanging the first touch function and the second touch function in the device. The device comprises touch sensors arranged on opposite faces of the device. The functionality of the touch sensors typically relates to an orientation of the device with respect to the user. For example, the touch sensor facing the user may be used for touch based interaction with the user, whereas the touch sensor facing away from the user may be configured to disregard touch input, or be used for additional touch based interaction with the user. It is desirable to, when the user turns the device about-face to switch between viewing the content in 2D and 3D, to exchange sensor functionality in the device accordingly. To accommodate this, the first sensor function of the first touch sensor and the second sensor function of the further sensor are exchanged in the device, and as a result, their functionality is exchanged in, e.g., an application running on the device.

Optionally, the 3D display is an autostereoscopic multi-view 3D display. An autostereoscopic multi-view 3D display is well suited for use in a mobile display device as the viewing angle of said display is typically large in comparison to an autostereoscopic two-view 3D display, i.e., a common type of autostereoscopic display. As such, 3D viewing of the content is possible even in cases when the device is oriented non-ideally to the user.

It will be appreciated by those skilled in the art that two or more of the above-mentioned embodiments, implementations, and/or aspects of the invention may be combined in any way deemed useful. Modifications and variations of the tablet device, the smart phone, the method and/or the computer program product, which correspond to the described modifications and variations of the mobile display device, can be carried out by a person skilled in the art on the basis of the present description. The invention is defined in the independent claims. Advantageous options are defined in the dependent claims.

A product "Nintendo 3DS", as described on the manufacture's website http://www.nintendo.com/3ds/hardware/specs on Aug. 8, 2011, is a portable gaming console having a so-termed 'clamshell' form factor. The product comprises, inside the clamshell, an upper screen and a lower screen. The upper screen is said to be a LCD display enabling 3D view without the need for special glasses, and the lower screen is said to be a LCD having a touch screen. It is further noted that one of the upper screen's characteristic features is the ability to adjust or turn off 3D effect with a so-termed 3D Depth Slider.

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

Figure 1A:
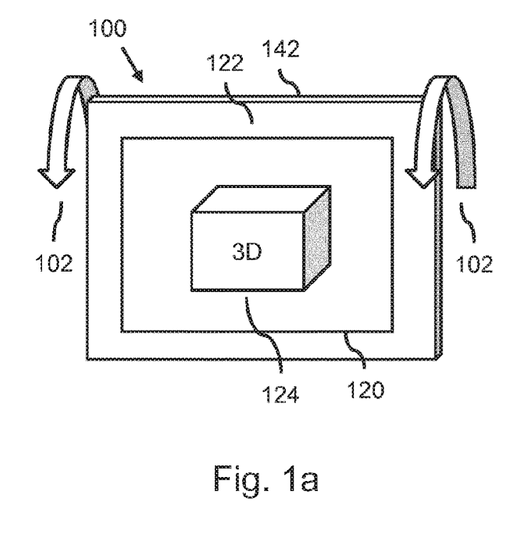
FIG. 1a shows a mobile display device according to the present invention.
Figure 1B:
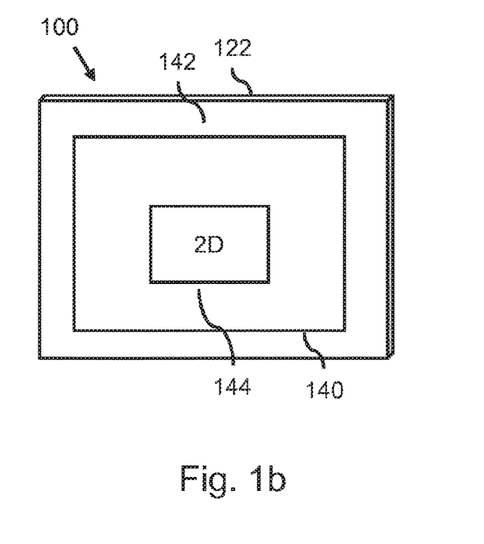
FIG. 1b shows the mobile display device after being turned about-face.

FIG. 1a shows a mobile display device 100, henceforth referred to as device 100, comprising a 3D display 120 arranged on a first face 122 of the device 100. The 3D display 120 enables 3D viewing of content, the content being in the following, by way of example, an image of a box. The 3D display 120 is shown to display the content as 3D content 124, which is illustrated in FIG. 1a by a 3D perspective drawing of the box being displayed on the 3D display 120. FIG. 1a further illustratively shows a turning of the device 100 by means of curved arrows 102. FIG. 1b. shows the device 100 after being turned about-face, with a second face 142 of the device 100 being visible that is arranged oppositely of the first face 122 with respect to the device 100, i.e., being an opposite face with respect to the first face 122. The device 100 comprises a 2D display 140 arranged on the second face 142 of the device 100. The 2D display 140 is shown to display the content as 2D content 144, which is illustrated in FIG. 1b by a 2D drawing of a box being displayed on the 2D display 140.

Although not shown in FIG. 1a or FIG. 1b, the device 100 further comprises a display processor for displaying the content as 3D content 124 on the 3D display 120 and for displaying the content as 2D content 144 on the 2D display 140. Here, the term displaying the content as 2D content is to be understood as providing the content in a format that is displayable on the 2D display 140, i.e., as content formatted for display on the 2D display 140. For example, if the content is originally 2D content, i.e., already in a format that is displayable on the 2D display 140, the display processor may not need to perform any processing of the content in order to provide the content as 2D content 144. If the content is originally 3D content, however, the display processor may need to reformat the content, e.g., by omitting the depth information from the content when the content is originally of the so-termed image+depth format in order to provide only the image information of the image+depth format as the 2D content 144. As another example, when the content is originally of the so-termed left+right format, the reformatting may comprise providing the left image of the content as the 2D content 144 and omitting the right image.

Similarly, the term displaying the content as 3D content is to be understood as providing the content in a format that is displayable on the 3D display 120. For example, when the content is originally 2D content, the display processor may need to reformat the content such that the content is displayable on the 3D display 120. Depending on the type of 3D display 120 and the type of display processor, the reformatting may comprise, e.g., adding a depth map to the content to obtain the 3D content 124 in the image+depth format. Similarly, the reformatting may comprise providing each image of the content both as left image and as right image to obtain the 3D content 124 in the left+right format.

In general, the format of the 3D content 124 is such that, when being displayed on the 3D display 120, each of the eyes of the user is provided with a separate view of the content. As a result, the user typically obtains a perception of depth. This perception is known in the field of visual perception as stereopsis, with the creating of stereopsis being referred to as stereoscopy. It will be appreciated that both separate views of the content may in fact be separate, yet identical views. For example, when each image of the content is provided both as left image and as right image to obtain the 3D content 124 in the left+right format, the user may not obtain an impression of depth despite viewing the content as 3D content 124 on the 3D display 120. Moreover, even when the content is originally 3D content, the content may at times not provide any stereoscopy by, e.g., showing scenes which do not contain any depth.

It is noted that the term content refers to any type of content that may be displayed on the device 100, e.g., movies, internet content, photos, or the visual output of applications, games, etc. In case the content is generated by the device 100 itself, the display processor may not need to reformat the content. For example, the content may be generated by an application or a game running on the device 100. Instead of reformatting the content provided by the application or game, the display processor may instead instruct the application or game to immediately generate the content in the required format. For example, when the device 100 is running a game, the game may be instructed to also generate depth information next to the image information in order to provide the content immediately in an image+depth format for display as 3D content 124 on the 3D display 120.

In this respect, it is noted that the term 3D content is not to be understood as referring to, e.g., when the content is visual output of a game or application, that the game or application involves a 3D environment. Such 3D environments are typically generated using computer graphics to portray the 3D environment by means of, e.g., polygon meshes. Although such games and applications are frequently referred to as 3D games and 3D applications, they do not necessarily involve stereoscopy. Rather, the term 3D content refers to content being displayable on the 3D display 120 for providing stereoscopy. Of course, it is not excluded that the 3D content 124 also portrays a 3D environment.

The display processor may be arranged for performing a 2D-to-3D conversion when the content is originally 2D content for displaying the content as 3D content 124 on the 3D display 120. The term 2D-to-3D conversion refers to synthetically adding depth or disparity to the content to create an appearance of the content being originally 3D content. Such conversions are known from the field of video processing, e.g., from the publication "*Converting 2D to 3D: A Survey*" by Qingqing Wei, Delft University of Technology, December 2005. It will be appreciated, however, that said conversion may also involve converting the content into 3D content 124 by simply establishing the content at a fixed depth or disparity. Moreover, the display processor may be arranged for performing a 3D-to-2D conversion when the content is originally 3D content for displaying the content as 2D content 144 on the 2D display 140. The term 3D-to-2D conversion refers to converting content having disparity or depth information to content that is displayable without the disparity or depth information, e.g., by removing a depth map from an image+depth format or calculating an intermediate image between a left image and a right image using interpolation techniques.

FIG. 1a and FIG. 1b show a user, when turning the device 100 about-face, obtaining either 3D viewing of the content on the 3D display 120 or 2D viewing of the content on the 2D display 140. For that purpose, the content may be provided as 3D content 124 on the 3D display 120 at the same time as being provided as 2D content 144 on the 2D display 140, for, irrespective of the orientation of the device 100, providing the content to the viewer. As a consequence, both displays may be simultaneously displaying the content.

Figure 2:
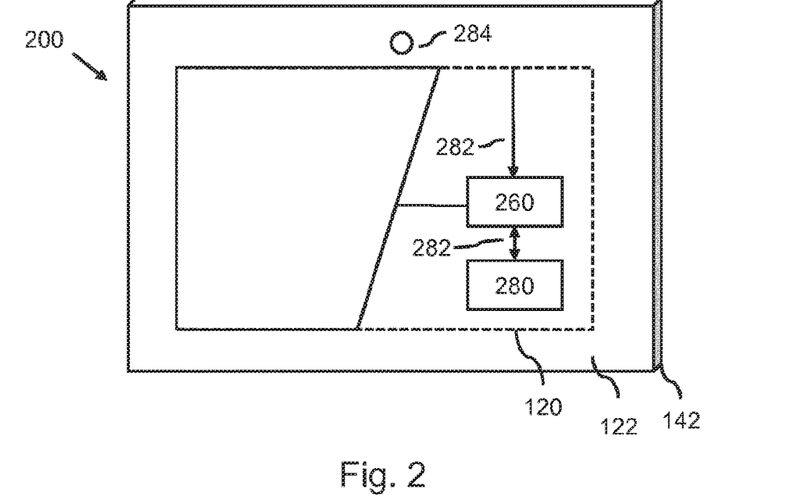
FIG. 2 shows the mobile display device comprising an orientation means.

FIG. 2 shows a mobile display device 200 comprising, by way of example, two orientation means, i.e., a first camera 284 and an accelerometer 280. Each of the orientation means generates orientation data 282 indicative of an orientation of the device 200. FIG. 2 shows, in a cutaway view of the device 200, the display processor 260. The display processor 260 is arranged for, in dependence on the orientation data 282, displaying the content either on the 3D display 120 or on the 2D display 140. Consequently, the display processor 260 may be arranged for not displaying the content on the other display, e.g., by switching off the other display, minimizing its brightness or by not providing the content to the other display.

The first camera 284 constitutes a first one of the orientation means. The first camera 284 is arranged alongside the 3D display 120, and thus faces in approximately the same direction as the 3D display 120. The first camera 284 is used in the device 200 to estimate the orientation of the device 200 with respect to the user by detecting a presence of the user in a viewport of the first camera 284. For that purpose, the first camera 284 and/or the device 200 may comprise face detection functionality for detecting whether a face is present and/or where a face is located in the viewport of the first camera 284. The face detection functionality may be of provided by, e.g., a skin tone based face detection, Viola-Jones object detection or any known type of face detection. It will be appreciated that when the user is detected within the viewport of the first camera 284, it may be concluded that the device 200 is oriented such that the 3D display 120 faces the user. Similarly, when assuming the user is operating the device 200, if the user is not detected within the viewport of the first camera 284, it may be concluded that the device 200 is oriented such that the 3D display 120 faces away from the user, and as a consequence, the oppositely arranged 2D display 140 faces towards the user. As such, the display processor 260 may be arranged for, in dependence on the orientation data 282, displaying the content either on the 3D display 120 or on the 2D display 140 depending on whether the user is detected within the viewport of the first camera 284 or not.

It is noted that the first camera 284 may also have other functionality within the device 200. In particular, the first camera 284 may be additionally, or primarily, be used for, e.g., taking photos, recording videos, providing video chat functionality, etc. Moreover, the device 200 may comprise a first camera that does not function as an orientation means, but instead comprise another form of orientation means or no orientation means at all.

The cutaway view further shows the accelerometer 280 constituting a second one of the orientation means. The accelerometer 280 estimates the orientation of the device 200 by establishing a direction of gravity. Given that the orientation of the accelerometer 280 within the device 200 is known, it can be determined how the device 200 is oriented with respect to the direction of gravity and as such the the orientation of the device 200 may be established with respect to the direction of gravity. When assuming that, e.g., the user typically views the device 200 by looking in a downward direction onto the device 200, the orientation of the device 200 with respect to the direction of gravity is indicative of the orientation of the device 200 with respect to the user. Consequently, the display processor 260 may display the content on either of the displays using the orientation of the device 200 with respect to the direction of gravity and an assumption on the user's viewing direction.

It will be appreciated that any other type of orientation means may be used as well instead, or in addition to, the accelerometer 280 and the first camera 284. For example, the device 200 may comprise a gyroscope as orientation means. In particular, an orientation means may be used that specifically establishes the orientation of the device 200 with respect to the user. For example, the orientation means may be constituted by a touch sensitive surface arranged along either or both displays for detecting placement of the user's hand on the device 200. The touch sensitive surface may be arranged for, e.g., sensing whether user's fingers or thumb are placed thereon. Accordingly, when assuming that the user places his thumb on the face of the device 200 facing towards him and his fingers on the face of the device 200 facing away, the orientation of the device 200 with respect to the user may be established by sensing on which face the fingers and/or the thumb are placed.

Figure 3:
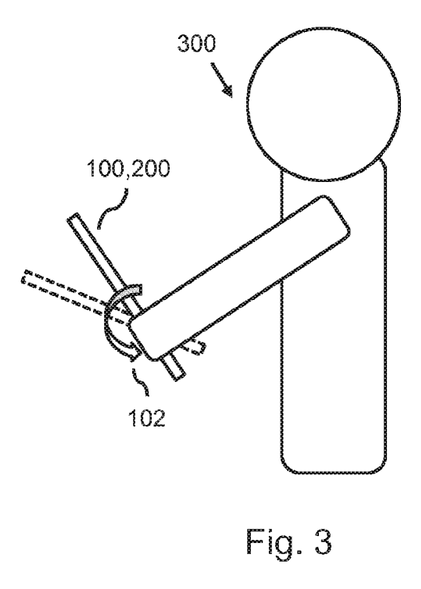
FIG. 3 shows a user turning the mobile display device.

FIG. 3 shows a user 300 holding the device 100, 200, while also illustratively showing a subsequent turning of the device 100, 200 by means of the curved arrows 102 and the dashed outline. When initially holding the device 100, 200, the display processor may display the content on the upward facing one of the displays by using, e.g., an accelerometer to determine which one of the displays is the upward facing one, or by using a camera to determine which of the displays faces the user, i.e., being the upward facing one of the displays in the situation depicted in FIG. 3. In this respect, it is noted that upward facing is understood as facing more upward than downward, i.e., in an upward direction, and downward as facing towards the ground or towards the direction of gravity.

When subsequently turning the device 100, 200, e.g., for switching between 2D viewing and 3D viewing of the content, the display processor may again determine which one of the displays is the upward facing one and/or facing the user using the orientation means, and then display the content thereon. The display processor may be configured to always display the content on the upward facing one and/or the one facing the user. As a result, the display processor may switch between displaying the content on the 3D display and displaying the content on the 2D display when or after the user turns the device 100, 200 about-face. Of course, the display processor may also be configured to always display the content on the downward facing one of the displays, as discussed in reference to FIG. 4b.

Additionally or alternatively, the orientation means may determine a change in the orientation of the device 100, 200, and the display processor may switch between displaying the content on the 3D display and displaying the content on the 2D display based on the change in orientation. Thus, additionally or alternatively to using the orientation of the device 100, 200 to switch between displaying the content on the 3D display and displaying the content on the 2D display, said change in orientation may be used.

Figure 4A:
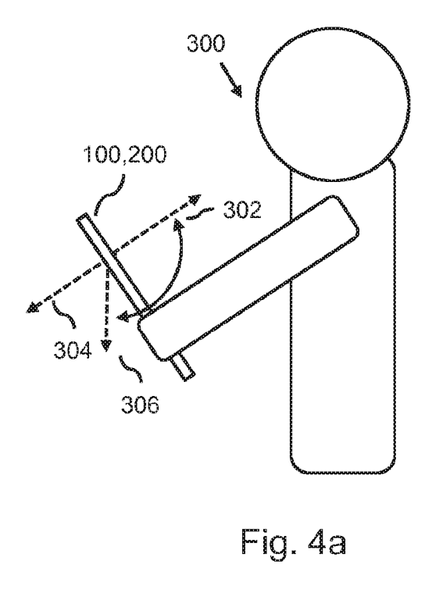
FIG. 4a shows a user operating the mobile display device while standing.

FIG. 4a shows the user 300 operating the device 100, 200 while standing or sitting, while also illustratively showing the normal vector 302 of the display surface of the display facing the user 300, the normal vector 304 of the display surface of the display facing away from the user 300, as well as the direction of gravity 306. The device 100, 200 may be arranged for always displaying the content on the upward facing one of the displays. For that purpose, an accelerometer may be used to determine which of the normal vectors 302, 304 is more aligned with the direction of gravity 306, and which of the normal vectors 302, 304 is less aligned with the direction of gravity 306. This may allow establishing which one of the displays is the upward facing one and which one of the displays is the downward facing one. It may be assumed that the user 300 is viewing the device 200 from above, as would typically be the case when standing or sitting. The display processor may therefore be arranged for always displaying the content on the upward facing one of the displays.

Figure 4B:
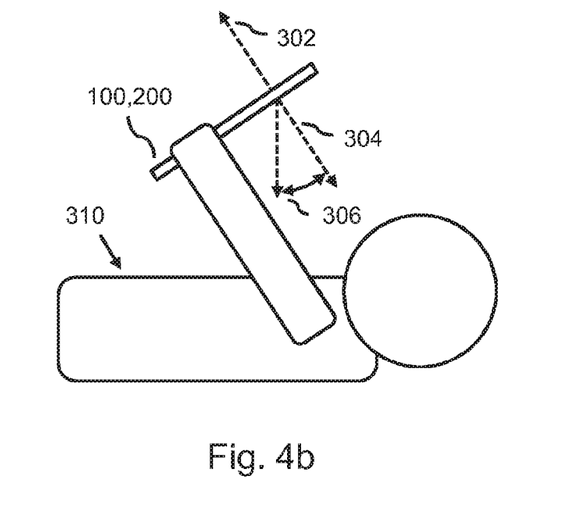
FIG. 4b shows the user operating the mobile display device while lying.

FIG. 4b shows the user 310 operating the device 100, 200 while lying, e.g., on a couch. In this situation, it may be assumed that the user 310 is viewing the device 100, 200 from below, and the display processor may be arranged for always displaying the content on the downward facing one of the displays. For switching between the two aforementioned configurations of the display processor, i.e., displaying the content on the upward facing one of the displays or displaying the content on the downward facing one of the displays, the device 100, 200 may comprise a user input for enabling the user 310 to select between the two configurations, i.e., to configure the display processor for displaying the content on either the upward or the downward facing one of the displays. The user input may take the form of a physical switch or button arranged on the device 100, 200, a user interface button that is displayed on either or both of the displays and that is operable by touch, a voice operable user input or having any other suitable form.

It will be appreciated that when comprising a camera as orientation means, the display processor may always display the content on the display facing the user 310 without a need for configuring the display processor between the two aforementioned configurations and without a need for assuming a viewing direction of the user 310. Thus, it may not be needed to indicate to the device 100, 200 whether the user 310 is standing, sitting or lying. The device 100, 200 may nevertheless comprise a user input to allow the user 310 to manually select the display on which the content is displayed. As such, the user input may function as an override, e.g., when it cannot be reliably determined which display the user 310 is facing. The latter may be due to, e.g., poor lighting conditions. The device 100, 200 may also comprise a user input to allow the user 310 to manually select either of the displays when the device 100, 200 does not comprise an orientation means. Alternatively, when the device 100, 200 does not comprise an orientation means, the display processor may be configured for displaying the content on both displays simultaneously.

Figure 5A:
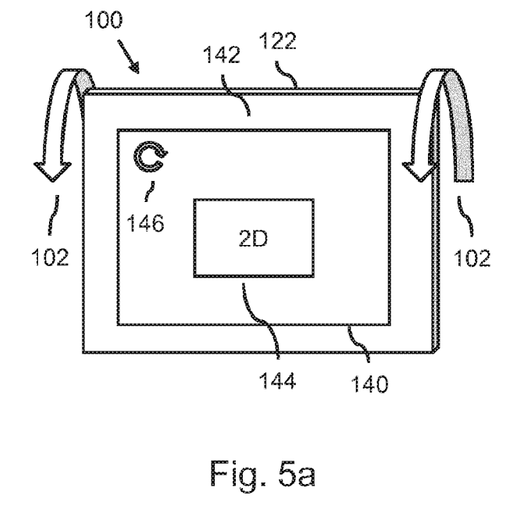
FIG. 5a shows a mobile display device displaying originally 3D content on a 2D display and displaying an indicator on the 2D display.
Figure 5B:
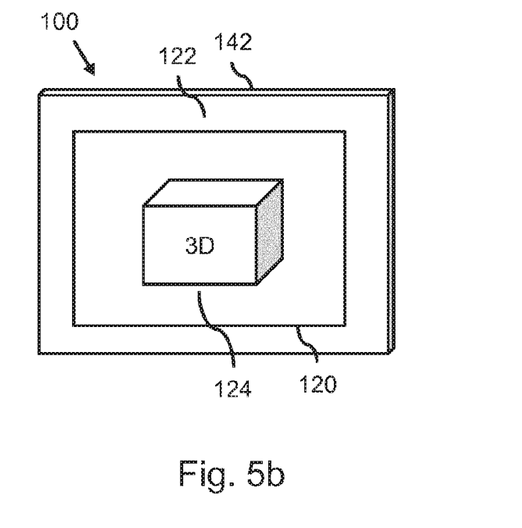
FIG. 5b shows the mobile display device after being turned about-face.

FIG. 5a shows the device 100 of FIG. 1a and FIG. 1b, in which the display processor is arranged for additionally displaying an indicator 146 on the 2D display 140 when displaying originally 3D content on the 2D display 140 for alerting the user to turn the device 100 about-face to obtain 3D viewing of the content on the 3D display 120. The indicator 146 may be a graphical element, e.g., an icon, or a text. The display processor may determine that the content is originally 3D content by, e.g., determining whether a reformatting of the content was needed in order to display the content on the 2D display 140. FIG. 5b shows a result of the user turning the device 100 about-face, in that the content is displayed as 3D content 124 on the 3D display 120, i.e., in its original format.

Alternatively or additionally, the display processor may be arranged for displaying the indicator 146 on the 3D display 120 when displaying originally 2D content thereon for alerting the user to turn the device 100 about-face to obtain 2D viewing of the content on the 2D display 140. Both indicators may be the same or similar, e.g., indicating only to turn the device 100 about-face, or may differ in order to indicate whether the content is originally 3D content or originally 2D content to indicate which display to view.

Figure 6A:
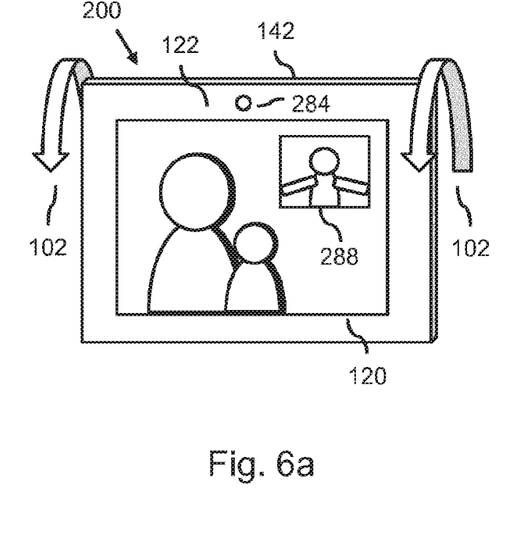
FIG. 6a shows a mobile display device running a video chat application.
Figure 6B:
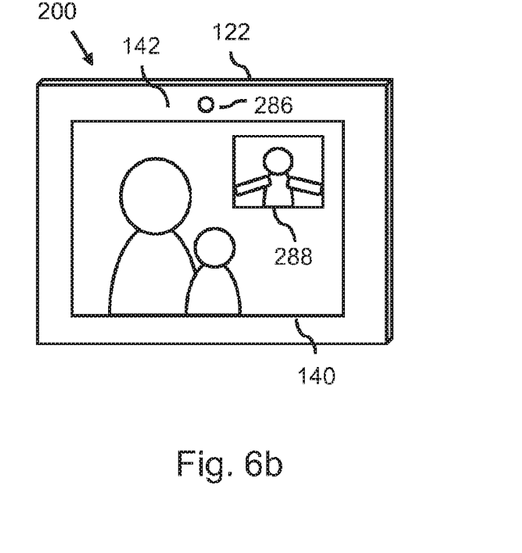
FIG. 6b shows the mobile display device with the functionality of the first and second camera being exchanged in the video chat application after being turned about-face.

FIG. 6a shows the device 200 of FIG. 2 running a video chat application. Here, the user is facing the 3D display 120, which is apparent from the video chat application showing the viewport of the first camera 284 in a window 288 and the user being visible in the viewport. The window 288 thus shows what the first camera 284 is recording and transmitting to the other party. The user may decide to turn the device 200 about-face, e.g., to use the video chat application on the 2D display 140. FIG. 6b shows the result of the user turning the device 200 about-face. It is visible here that the device 200 comprises a second camera 286 arranged alongside the 2D display 140. Moreover, the display processor is arranged for, in dependence on the orientation data, switching from using the first camera 284 as video chat recording device to using the second camera 286 as video chat recording device. As a result, after turning the device 200 about-face, the second camera 286 is now used for recording the user and transmitting the result to the other party. This is apparent from the viewport show in the window 288 being substantially identical to that of FIG. 6a, i.e., again showing the user.

It will be appreciated, that in general, the first camera may have a first camera function in the device, the second camera may have a second camera function in the device, and the display processor may be arranged for, in dependence on the orientation data, exchanging the first camera function and the second camera function in the device when switching between displaying the content on the 3D display and the 2D display. Additionally or alternatively, the display processor may, after having determined which display the user is facing, assign a first camera function to the camera alongside said display, and assign a second camera function to the other camera arranged alongside the other display. The first camera function may relate to, e.g., taking self-portrait pictures or recording video for use in a video chat application, whereas the camera second function may relate to, e.g., photography or camera functionality.

Moreover, the first camera and the second camera may together constitute an orientation means. For that purpose, the device may comprise face detection functionality for detecting whether a face is present in the viewport of the first camera and/or whether a face is present in the viewport of the second camera. Consequently, it may not be needed to assume that when the user is not present in the viewport of the first camera arranged alongside the 3D display, that the user is facing the 2D display, as this can be determined directly by detecting whether the user is present in the viewport of the second camera.

The device may comprise a first touch sensor arranged on or along the 3D display and a second touch sensor arranged on or along the 2D display. In particular, the 3D display may comprise a first touch sensitive layer for allowing the user to interact with the content displayed on the 3D display. As such, the 3D display functions as a user input device. Moreover, the 2D display may comprise a second touch sensitive layer for allowing the user to interact with the content displayed on the 2D display. Consequently, the 3D display and the 2D display as shown in the Figures may each comprise a touch sensitive layer, and as a result, a user input device may be provided on both faces of the device. The first touch sensor may have a first touch function in the device, the second touch sensor may have a second touch function in the device, and the display processor may be arranged for, in dependence on the orientation data, exchanging the first touch function and the second touch function in the device. In particular, the first touch function may relate to allowing touch based interaction between the user and the device, and the second touch function may relate to preventing all touch based interaction, i.e., the second touch function may correspond to effectively disabling the second touch sensor for touch based interaction. As such, the display processor may exchange the first touch function and the second touch function in order to allow touch based interaction on the face of the device facing the user, and to prevent touch based interaction on the opposite face of the device, i.e., that is facing away from the user.

The 3D display may be an autostereoscopic multi-view 3D display. Such displays are known per se from the technical field of 3D displays, and are particularly suitable for use in a mobile computing as, owing the autostereoscopic aspect, the user does not need the user to wear glasses or similar devices to obtain the 3D viewing, and, owing to the multi-view aspect, provide a wide range of viewing positions suitable for 3D viewing. Alternatively, autostereoscopic stereo 3D displays may be used which emit two views for allowing stereoscopy without glasses but at a smaller range of viewing positions.

Alternatively, non-autostereoscopic displays may be used, thus requiring the user to, e.g., wear polarized-based or shutter-based glasses for obtaining the 3D viewing. In this case, the orientation means may be arranged for determining the orientation of the device with respect to the user by determining the orientation of the device with respect to the glasses, i.e., the presence and/or location of the glasses is assumed to be indicative of the presence and/or location of the user. For example, when the orientation means is constituted by a camera, the camera may be arranged for detecting a presence and/or location of the glasses in the viewport for estimating the orientation of the device with respect to the user. Moreover, the glasses may be arranged to facilitate detection by the orientation means.

The 3D display and the 2D display may be substantially equally sized. In particular, both displays may have a same light modulating portion, and thus differ mainly by the 3D display additionally comprising a view forming portion, e.g., a lenticular lens array.

The device as previously described may be a tablet device, i.e., being capable of running applications and comprising a touch display with a screen diagonal of approximately 5" or larger. The device may also be a smart phone, i.e., being capable of running applications, providing phone functionality and comprising a touch display with a screen diagonal between approximately 3" and 5". The device may also be a digital photo frame, portable optical disc player, digital media player or any similar mobile display device.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A mobile display device for enabling a user to obtain either three-dimensional [3D] or two-dimensional [2D] viewing of content, comprising:
    a 3D display for enabling the 3D viewing of the content;
    a 2D display for enabling the 2D viewing of the content;
    a display processor for displaying the content as 3D content on the 3D display and for displaying the content as 2D content on the 2D display;
    the 3D display and the 2D display being arranged on opposite faces of the device for enabling the user to obtain either the 3D viewing or the 2D viewing of the content by turning the device about-face; and
    an accelerometer for establishing a direction of gravity, wherein the accelerometer is configured for generating orientation data indicative of an orientation of the device; wherein
    the display processor is arranged for, in dependence on the orientation data, displaying the content either on the 3D display or on the 2D display, and wherein
    the displaying of content on either display comprises always displaying the content on an upward, or alternatively downward facing one of the 3D display and the 2D display by comparing the orientation of the device to the direction of gravity.

2. The mobile display device according to claim 1, further comprising a first camera for estimating the orientation of the device with respect to the user by detecting a presence of the user in a viewport of the first camera.

3. The mobile display device according to claim 1, further comprising a user input for enabling the user to configure the display processor for displaying the content on either the upward or the downward facing one of the 3D display and the 2D display.

4. The mobile display device according to claim 1, further comprising a first camera arranged alongside the 3D display and a second camera arranged alongside the 2D display, the first camera having a first camera function in the device, the second camera having a second camera function in the device, and the display processor being arranged for, in dependence on the orientation data, exchanging the first camera function and the second camera function in the device.

5. The mobile display device according to claim 1, wherein the display processor is arranged for:
    performing a 2D-to-3D conversion when the content is originally 2D content for said displaying the content as 3D content on the 3D display; or
    performing a 3D-to-2D conversion when the content is originally 3D content for said displaying the content as 2D content on the 2D display.

6. The mobile display device according to claim 1, wherein the display processor is arranged for:
    displaying an indicator on the 2D display when displaying originally 3D content on the 2D display for alerting the user to turn the device about-face to obtain 3D viewing of the content on the 3D display; or
    displaying the indicator on the 3D display when displaying originally 2D content on the 3D display for alerting the user to turn the device about-face to obtain 2D viewing of the content on the 2D display.

7. The mobile display device according to claim 1, further comprising a first touch sensor arranged on or along the 3D display and a second touch sensor arranged on or along the 2D display.

8. The mobile display device according to claim 7, the first touch sensor having a first touch function in the device, the second touch sensor having a second touch function in the device, and the display processor being arranged for, in dependence on the orientation data, exchanging the first touch function and the second touch function in the device.

9. The mobile display device according to claim 1, wherein the 3D display is an autostereoscopic multi-view 3D display.

10. The mobile display device according to claim 1, wherein the display processor is arranged for, when displaying the content on the upward facing one of the 3D display and the 2D display, switching off or minimizing the brightness of the down facing one of the 3D display and the 2D display.

11. A tablet device, smart phone or digital photo frame comprising the mobile display device according to claim 1.

12. A method of enabling a user to obtain either three-dimensional [3D] or two-dimensional [2D] viewing of content using a mobile display device, the mobile display device comprising:
    a 3D display for enabling the 3D viewing of the content;
    a 2D display for enabling the 2D viewing of the content; and
    the 3D display and the 2D display being arranged on opposite faces of the device; and
    an accelerometer for establishing a direction of gravity, wherein the accelerometer is configured for generating orientation data indicative of an orientation of the device; wherein
    the method comprises:
    (i) obtaining the orientation data from the orientation means; and
    (ii) displaying, in dependence on the orientation data, the content either as 3D content on the 3D display or as 2D content on the 2D display for enabling the user to obtain either the 3D viewing or the 2D viewing of the content by turning the device about-face, wherein the displaying the content on either display comprises always displaying the content on an upward, or alternatively downward facing one of the 3D display and the 2D display by comparing the orientation of the device to the direction of gravity.

13. A non-transitory computer readable medium comprising a computer program, the computer program comprising instructions for causing a processor system to perform the method according to claim 12.

* * * * *